US010327123B1

(12) United States Patent
Gitlin et al.

(10) Patent No.: US 10,327,123 B1
(45) Date of Patent: Jun. 18, 2019

(54) SYSTEM AND METHOD FOR MACHINE-TO-MACHINE COMMUNICATION IN AN INTERNET-OF-THINGS NETWORK

(71) Applicants: Richard Dennis Gitlin, Tampa, FL (US); Mohamed Elkourdi, Tampa, FL (US); Asim Mazin, Tampa, FL (US)

(72) Inventors: Richard Dennis Gitlin, Tampa, FL (US); Mohamed Elkourdi, Tampa, FL (US); Asim Mazin, Tampa, FL (US)

(73) Assignee: University of South Florida, Tampa, FL (US)

( * ) Notice: Subject to any disclaimer, the term of this patent is extended or adjusted under 35 U.S.C. 154(b) by 0 days.

(21) Appl. No.: 16/104,412

(22) Filed: Aug. 17, 2018

Related U.S. Application Data

(60) Provisional application No. 62/653,887, filed on Apr. 6, 2018.

(51) Int. Cl.
| | |
|---|---|
| *H04W 4/70* | (2018.01) |
| *H04L 12/66* | (2006.01) |
| *H04B 7/0413* | (2017.01) |
| *H04L 29/08* | (2006.01) |

(52) U.S. Cl.
CPC .......... *H04W 4/70* (2018.02); *H04B 7/0413* (2013.01); *H04L 12/66* (2013.01); *H04L 67/12* (2013.01)

(58) Field of Classification Search
None
See application file for complete search history.

(56) References Cited

U.S. PATENT DOCUMENTS

| | | | |
|---|---|---|---|
| 2015/0349866 A1* | 12/2015 | Benjebbour | H04L 5/00 370/329 |
| 2018/0035406 A1* | 2/2018 | Hao | H04L 5/0007 |
| 2018/0041988 A1* | 2/2018 | Lee | H04L 5/00 |

(Continued)

OTHER PUBLICATIONS

"Signature-based Non-orthogonal Multiple Access (S-NOMA) for Massive Machine-Type Communications in 5G", Mostafa Mohammadkarimi, Member, IEEE, Muhammad Ahmad Raza, Student Member, IEEE, Octavia A. Dobre, Senior Member, IEEE Aug. 2018 (Year: 2018).*

(Continued)

*Primary Examiner* — Kodzovi Acolatse
(74) *Attorney, Agent, or Firm* — Molly L. Sauter; Smith & Hopen, P.A.

(57) ABSTRACT

A system and method for Machine-to-Machine (M2M) communication over a transmission medium, including a novel random access protocol that is easy to implement, energy efficient, scalable and compatible with the limited-power and low complexity requirements of IoT devices. The proposed protocol utilizes a form of multiple hypothesis testing at the IoT gateway to determine the number of active IoT devices operating in the transmission medium to optimize the power levels of a Successive Interference Cancellation (SIC) receiver in order to distinguish between signals transmitted from different IoT devices on the same time and frequency. The use of beamforming exploits the power and spatial domains without excessively increasing the SIC power levels and address channel access delay problems by reducing the probability of collision and consequently lowering the average back-off delay.

20 Claims, 6 Drawing Sheets

(56) References Cited

U.S. PATENT DOCUMENTS

2018/0070346 A1* 3/2018 Soldati .............. H04W 72/0406
2018/0131433 A1* 5/2018 Kang ........................ H04L 1/00

OTHER PUBLICATIONS

Al Rabee et al., The optimum received power levels of uplink non-orthogonal multiple access (NOMA) signals. IEEE Wireless and Microwave Technology Conference (WAMICON). 2017. Cocoa Beach, Fl, USA: 1-4.
Balevi et al., Aloha-NOMA for Massive Machine-to-Machine IoT Communication. IEEE International Conference on Communications (ICC). 2018: 1-5.
Elkourdi et al, Enabling Aloha-NOMA for Massive M2M Communication in IoT Networks. Accepted 2018 IEEE Wireless and Microwave Technology Conference (WAMICON). 2018: 1-4.
Choi. NOMA-based random access with multichannel Aloha. IEEE Journal on Selected Areas in Communications. 2017. vol. 35 (No. 12): 2736-2743.

\* cited by examiner

Successive Interference Cancellation (SIC) Receiver

SYSTEM AND METHOD FOR MACHINE-TO-MACHINE COMMUNICATION IN AN INTERNET-OF-THINGS NETWORK

CROSS-REFERENCE TO RELATED APPLICATIONS

This application claims priority to U.S. Provisional Patent Application No. 62/653,887 filed on Apr. 6, 2018, entitled "Enabling Slotted Aloha-Noma for Massive Machine-To-Machine (M2M) Communication in Internet of Thing (IOT) Networks".

BACKGROUND OF THE INVENTION

The rapid growth of both the number of connected devices, and the data volume that is expected to be associated with IoT applications, has increased the popularity of Machine-to-Machine (M2M) type communication within 5G wireless communication systems. Hence, it is necessary to rethink the medium access control (MAC) protocol to address the massive number of devices accessing the shared medium and the limited-power and low complexity requirements of IoT devices.

Coordinated medium access protocols such as time-division multiple access (TDMA), frequency-division multiple access (FDMA), or code-division multiple access (CDMA) are contention-free protocols which ensure that resources are exclusively scheduled for each device. However, these protocols are not scalable and cannot provide sufficient throughput to meet the demands of a massive number of IoT devices due to the empty slots and the scheduling overhead required for the connection establishment before each transmission.

As such, uncoordinated random access protocols have attracted lots of attention in the standards as a possible method for enabling a massive number of M2M communication links using short packets possible, while maintaining a low signaling overhead. However, uncoordinated medium access protocols, such as Aloha and Slotted Aloha (SA) only perform well in small networks and cannot provide sufficient throughput in networks with many IoT devices that are simultaneously transmitting over the shared medium due to collisions at the IoT gateway.

Similar issues exist in IEEE 802.11, which is based on carrier-sense multiple access with collision avoidance (CSMA/CA), where collisions can still happen due to the hidden and exposed terminal scenarios. Moreover, CSMA/CA is not compatible with the limited-power requirements of IoT devices because it requires continuous channel monitoring.

The various MAC protocols known in the art fall short of achieving high throughput and a low channel-access delay for a large number of active IoT devices when the number of available radio resources is limited. Another drawback to MAC protocols known in the art is the high transmission power that is required as the number of active IoT devices increases, which makes them incompatible with power-limited IoT devices.

Accordingly, what is needed in the art is an improved MAC protocol for M2M communication that is scalable, matched to the limited-power requirement of IoT devices ad provides high throughput.

SUMMARY OF INVENTION

In various embodiments, the present invention provides a uncoordinated random medium access control (MAC) protocol for Internet of Thing (IoT) networks, which comprises slotted Aloha (SA) with power domain non-orthogonal multiple access (PD-NOMA) and multiple-input multiple-output beamforming (MIMO BF). In the present invention, the number of active IoT devices, which is not known a priori, is detected at the IoT gateway via multiple hypothesis testing. The proposed protocol, referred to as BF-SA-NOMA, is not only scalable ad compatible with the power-limited IoT devices, but also uses beamforming to significantly improve the throughput to 1.31 compared with 0.36 in conventional slotted Aloha when 6 active IoT devices can be successfully separated using 2×2 MIMO and a SIC (Successive Interference Cancellation) receiver with 3 optimum power levels. The proposed protocol achieves higher throughput than SAN-NOMA with a lower average channel access delay.

In one embodiment, the present invention provides, a method for Machine-to-Machine (M2M) communication over a transmission medium, which includes, broadcasting a notification signal, from an Internet of Things (IoT) gateway, to notify a plurality of IoT devices that the IoT gateway is available to receive transmission packets over the transmission medium. The method further includes, transmitting a training sequence over the transmission medium from each active IoT device of the plurality of devices in response to the notification signal ad receiving a superposed signal at the IoT gateway, wherein the superposed signal comprises each of the training sequences transmitted from each active IoT device. The method further includes, determining, by the IoT gateway, a number of active IoT devices based upon the received superposed signal. If the number of active IoT devices is less than or equal to a maximum number of optimum power levels of a Successive Interference Cancellation (SIC) receiver of the IoT gateway, a number of optimum power levels of the SIC receiver is set to be equal to the number of active IoT devices and the number of optimum power levels of the SIC receiver are broadcasted to the active IoT devices. Alternatively, if the number of active IoT devices is greater than a maximum number of optimum power levels of the SIC receiver, the method continues by aborting the setting of the number of optimum power levels of the SIC receiver and broadcasting a next notification signal comprising a random back-off request, to notify the plurality of IoT devices that the IoT gateway is available to receive transmission packets over the transmission medium and to request that the active IoT devices utilize a random back-off in a next transmission of the training sequence over the transmission medium.

If the number of active IoT devices is less than or equal to the number of optimum power levels of the SIC receiver, the method continues by receiving, at each of the active IoT devices, the number of optimum power levels of the SIC receiver, electing, by each of the active IoT devices, one of the optimum power levels of the SIC receiver ad one of a plurality of receiving antennas of the SIC receiver ad transmitting, by each of the active IoT devices, a device identification associated with the active IoT device ad a payload, the payload comprising the selected optimum power level of the SIC receiver and the selected receiving antenna of the SIC receiver. After receiving the device identification and payload from each of the active IoT devices, the method continues by, determining if the selected optimum power level of each of the active IoT devices is distinct and establishing a connection between each of the active IoT devices ad the SIC receiver if the selected optimum power level of each of the active IoT devices is distinct. Alternatively, if the selected optimum power level of each of the active IoT devices is not distinct, the method continues by not establishing a connection between each of the active IoT devices and transmitting a reselect signal to each of the active IoT devices to reselect an optimum power level. The steps of selecting optimum power levels is repeated until the selected optimum power levels are determined to be distinct or until a maximum number of attempts is exceeded. If the maximum number of attempts is exceeded without attaining distinct optimum power levels, the method continues by transmitting, from the IoT gateway a negative-acknowledgement signal to each of the active IoT devices instructing each of the IoT devices to utilize a random back-off in a next transmission of the training sequence over the transmission medium.

In one embodiment, the IoT gateway determines a number of active IoT devices utilizing multi-hypothesis testing of the received superposed signal.

In a additional embodiment, the present invention provides a system for Machine-to-Machine (M2M) communication over a transmission medium which includes, a transmitter for broadcasting a notification signal over a transmission medium to notify a plurality of IoT devices that an IoT gateway is available to receive transmission packets over the transmission medium and a receiver. The receiver for receiving a superposed signal at the IoT gateway, wherein the superposed signal comprises a training sequence transmitted from each active IoT device of the plurality of IoT devices, for determining a number of active IoT devices based upon the received superposed signal, for setting a number of optimum power levels of a Successive Interference Cancellation (SIC) receiver of the IoT gateway to be equal to the number of active IoT devices, if the number of active IoT devices is less than or equal to a maximum number of optimum power levels of the SIC receiver and for broadcasting the number of optimum power levels of the SIC receiver to the active IoT devices.

The receiver is further for aborting the setting of the number of optimum power levels of the SIC receiver if the number of active IoT devices is greater than a maximum number of optimum power levels of the SIC receiver and for broadcasting a next notification signal comprising a random back-off request, to notify a plurality of IoT devices that the IoT gateway is available to receive transmission packets over the transmission medium and to request that the active IoT devices utilize a random back-off in a next transmission of the training sequence over the transmission medium.

The receiver is further for receiving, from each active IoT device, a device identification associated with the active IoT device and a payload, the payload comprising a selected optimum power level of the SIC receiver and a selected receiving antenna of the SIC receiver, for determining if the selected optimum power level of each of the active IoT devices is distinct and for establishing a connection between each of the active IoT devices and the SIC receiver if the selected optimum power level of each of the active IoT devices is distinct.

The receiver is additionally for not establishing a connection between each of the active IoT devices and the SIC receiver if the selected optimum power level of each of the active IoT devices is not distinct, for transmitting a reselect signal, from the IoT gateway, to each of the active IoT devices to reselect an optimum power level and a receiving antenna, for receiving, from each of the active IoT devices, a device identification associated with the active IoT device and a reselected payload at the SIC receiver, the reselected payload comprising a reselected optimum power level of the SIC receiver and the selected receiving antenna of the SIC receiver, for determining if the reselected optimum power level of each of the active IoT devices is distinct, for repeating transmitting a reselect signal from the IoT gateway, receiving a device identification and a reselected payload from each of the active IoT devices at the SIC receiver and determining if the reselected optimum power level of each of the active IoT devices is distinct until the reselected optimum power each of the active IoT devices is determined to be distinct or until a maximum number of attempts has been exceeded and for transmitting a negative-acknowledgement signal to each of the active IoT devices instructing each of the IoT devices to utilize a random back-off in a next transmission of the training sequence over the transmission medium if the maximum number of attempts is exceeded.

In one embodiment, the receiver is further for determining a number of active IoT utilizing multi-hypothesis testing of the received superposed signal.

In a additional embodiment, the present invention provides a computer program product comprising computer executable instructions embodied on a computer-readable medium for performing steps comprising: broadcasting a notification signal to notify a plurality of IoT devices that a IoT gateway is available to receive transmission packets over the transmission medium; receiving a superposed signal comprising a training sequence transmitted by each active IoT device of the plurality of IoT devices in response to the notification signal; determining a number of active IoT devices based upon the received superposed signal; setting a number of optimum power levels of a Successive Interference Cancellation (SIC) receiver to be equal to the number of active IoT devices if the number of active IoT devices is less than or equal to a maximum number of optimum power levels of the SIC receiver, ad broadcasting the number of optimum power levels of the SIC receiver to the active IoT devices.

The computer program is further for performing, aborting, by the IoT gateway, the setting of the number of optimum power levels of the SIC receiver if the number of active IoT devices is greater than a maximum number of optimum power levels of the SIC receiver, and broadcasting a next notification signal, comprising a radium back-off request, to notify the plurality of IoT devices that the IoT gateway is available to receive transmission packets over the transmission medium and to request that the active IoT devices utilize a random back-off in a next transmission of the training sequence over the transmission medium.

The computer program product is additionally for performing, receiving, from each active IoT device, a device identification associated with the active IoT device ad a payload, the payload comprising a selected optimum power level of the SIC receiver and a selected receiving antenna of the SIC receiver, for determining if the selected optimum power level of each of the active IoT devices is distinct; and for establishing a connection between each of the active IoT devices and the SIC receiver if the selected optimum power level of each of the active IoT devices is distinct.

The computer program product is further for performing, not establishing a connection between each of the active IoT devices and the SIC receiver if the selected optimum power level of each of the active IoT devices is not distinct; for transmitting a reselect signal to each of the active IoT devices to reselect an optimum power level and a receiving antenna; for receiving, from each of the active IoT devices, a device identification associated with the active IoT device and a reselected payload at the SIC receiver, the reselected payload comprising a reselected optimum power level of the SIC receiver and the selected receiving antenna of the SIC receiver for determining if the reselected optimum power level of each of the active IoT devices is distinct; for repeating transmitting a reselect signal from the IoT gateway, receiving a device identification and a reselected payload from each of the active IoT devices at the SIC receiver and determining if the reselected optimum power level of each of the active IoT devices is distinct until the reselected optimum power each of the active IoT devices is determined to be distinct or until a maximum number of attempts has been exceeded; and for transmitting a negative-acknowledgement signal to each of the active IoT devices instructing each of the IoT devices to utilize a random back-off in a next transmission of the training sequence over the transmission medium if the maximum number of attempts is exceeded.

In a particular embodiment, the computer program product determines a number of active IoT devices by utilizing multi-hypothesis testing of the received superposed signal.

In various embodiments, the present invention exploits the simplicity of slotted Aloha (SA), the merit of MIMO beamforming in reducing collisions, and the superior throughput of non-orthogonal multiple access (NOMA) and its ability to resolve residual collisions via use of a successive interference cancellation (SIC) receiver.

BRIEF DESCRIPTION OF THE DRAWINGS

For a fuller understanding of the invention, reference should be made to the following detailed description, taken in connection with the accompanying drawings, in which.

DETAILED DESCRIPTION OF THE INVENTION

The BF-SA-NOMA protocol of the present invention is a synergistic combination of the low complexity SA protocol with the advantage of collision avoidance using MIMO-BF and the high throughput feature of NOMA.

The main bottleneck of SA systems is the low throughput caused by the high number of collisions, which can be addressed by MIMO-BF and NOMA. In BF-SA-NOMA, the signaling overhead is reduced in the detection phase of the proposed protocol where the number of active IoT devices are detected by the gateway using a form of multiple hypotheses testing. The inventive protocol is also an energy efficient protocol due to the fact that MIMO-BF reduces collisions and the SIC receiver resolves the residual collisions, thus minimizing retransmission. The proposed scheme also increases the conventional SA throughput, significantly.

Figure 1:
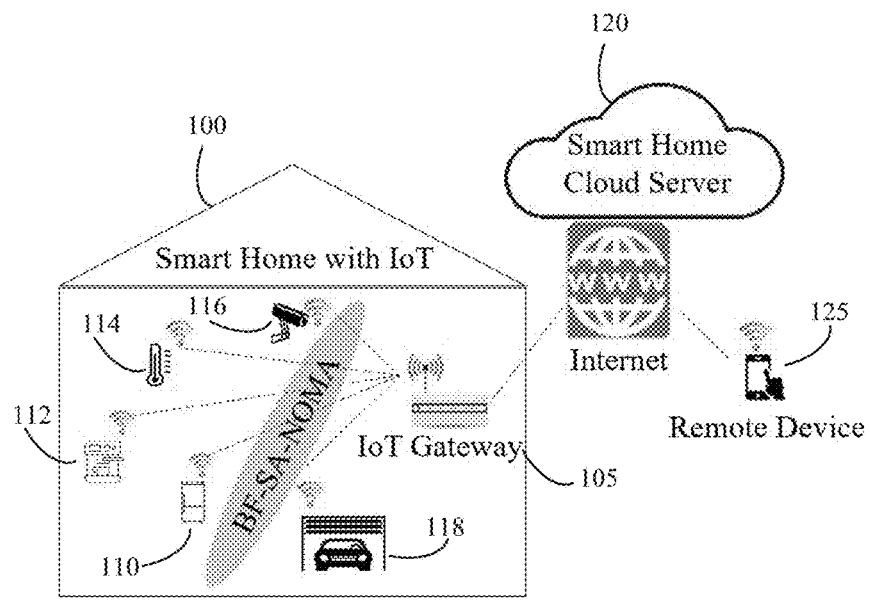
FIG. 1 is a illustration of a use case of the Beamforming, Slotted-Aloha, Non-Orthogonal Multiple-Input Multiple-Output (BF-SA-NOMA) protocol a implemented in a smart home with IoT, in accordance with an embodiment of the present invention.

A exemplary illustration of a scenario of the present invention is depicted in FIG. 1 as a smart home 100 with an IoT network. In this model, IoT devices 110, 112, 114, 116, 118 send their data to the IoT gateway 105 using the BF-SA-NOMA protocol and the IoT gateway 105 distinguish the signals utilizing an SIC receiver. The IoT gateway 105 may then send data received from the IoT devices 110, 112, 114, 116, 118 to an Internet-based cloud server 120, which may be accessed by a remote device 125.

Figure 2:
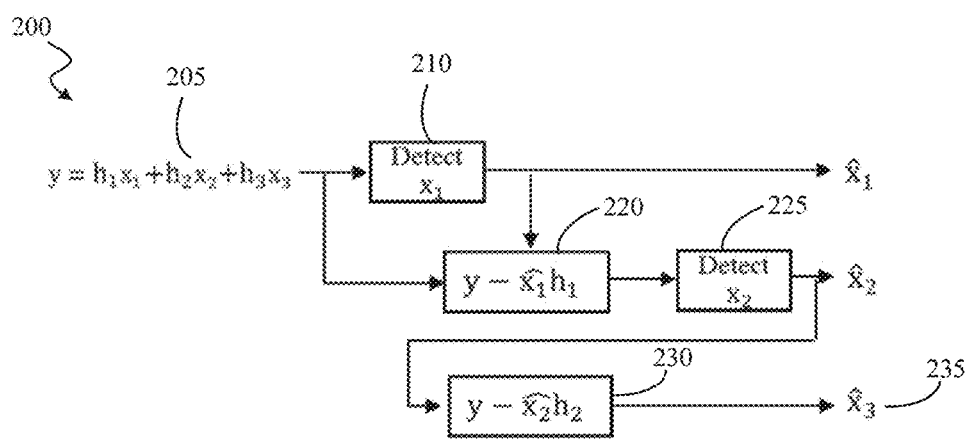
FIG. 2 is an illustration of Successive Interference Cancellation (SIC) receiver, in accordance with a embodiment of the present invention.

The BF-SA-NOMA protocol of the present invention can be suitable for various scenarios where many IoT devices are transmitting, simultaneously, on the same frequency with different power levels to a IoT gateway, wherein the received signals can be separated via use of a Successive Interference Cancellation (SIC) receiver. An SIC receiver has the ability to receive two or more signals, concurrently, that would otherwise came a collision. In general, the SIC receiver is able to decode the stronger signal, subtract it from the combined signal, and extract the weaker one from the residue. As shown in FIG. 2 an SIC receiver 200 may receive a composite signal 205 comprising signals transmitted from three different IoT devices and the associated interference. The SIC receiver 200 detects the strongest signal $(x_1)$ 210 from the composite signal 205, ad then subtracts the interference associated with $x_1$ from the composite signal 220 to detect the second signal $(x_2)$ 225. The SIC receiver 200 then subtracts the interference associated with the second signal $x_2$ from the composite signal 230 to detect the third signal $(x_3)$ 235

One of the main practical challenges for enabling the implementation of the BF-SA-NOMA protocol is the assignment of proper power levels for the IoT devices before transmitting the information; otherwise the signals received from different IoT devices cannot be successively extracted from the composite received signal. This issue becomes more challenging in dynamic environments, where the number of IoT devices with information ready to send is continuously changing.

In the present invention, this challenge is addressed via a flexible frame structure. Such a scheme provides great flexibility in adapting to changing network environments. This structure is opposite to that of TDMA or FDMA in which a new user arrival can completely change the overall frame structure such the additional user must be assigned at least one slot within the frame.

Figure 3:
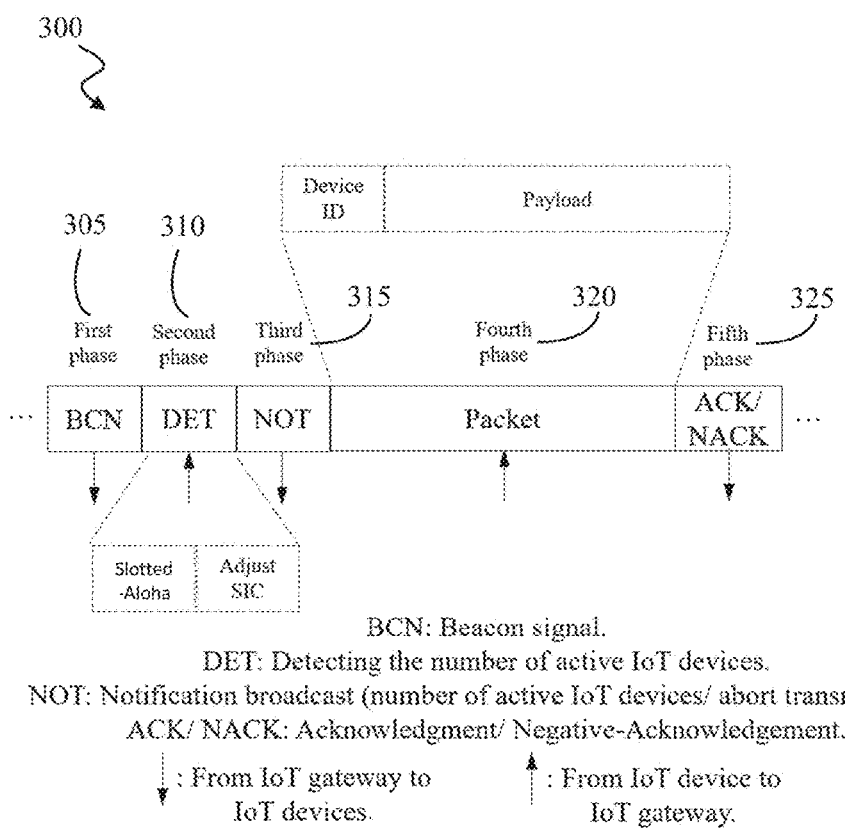
FIG. 3 is am illustration of the BF-SA-NOMA protocol frame structure, in accordance with an embodiment of the present invention.

As illustrated in FIG. 3, the proposed frame structure 300 is composed of 5 phases. In the first phase 305, the IoT gateway transmits a beacon signal to announce its readiness to receive packets.

Next 310, the IoT devices with packets ready to transmit send a training sequence to aid the IoT gateway in detecting the number of active IoT devices in the transmission medium. The IoT gateway detects the number of devices requesting transmission via a form of multiple hypotheses testing and adjusts the degree of SIC receiver for the optimum power levels. In practice, the SIC receiver has a fixed range of optimum power levels (e.g. m=2, 3). If the IoT devices were registered with the gateway, instead of the using multi-hypothesis testing method of the present invention, implementation would be simpler, however, doing so would significantly increase the length of the control phase and thus decrease the payload, or throughput, considering the potentially large number of IoT devices.

In the third phase 315, if the detected number of active IoT devices is not in the range of the total optimal power levels the IoT gateway aborts the transmission and starts the frame again by sending a new beacon signal and implying that the active transmitters utilize a random back-off in the next transmission. Alternatively, If the detected number of devices is in range of the SIC receiver, the IoT gateway broadcasts the degree of the SIC receiver to the transmitters and then each active IoT device randomly picks one of receiving antennas using a pre-calculated precoding matrix, and picks one of the optimum power levels. If the choices at each of the receiving antennas are distinct, the SIC receiver can decode the self-identifying signals (device ID+payload) and then the gateway sends an acknowledgement (ACK) to the active IoT devices. However, if the active IoT devices did not select distinct power levels, the reselection process is repeated ad after a few attempts, if there is no successful transmission, the IoT devices receive a negative-acknowledgment (NACK) and enter a random back-off mode. This method improves fairness among the users and will allow for the possibility of fewer active users in the next session, which will improve the probability of successful transmission.

Figure 4:
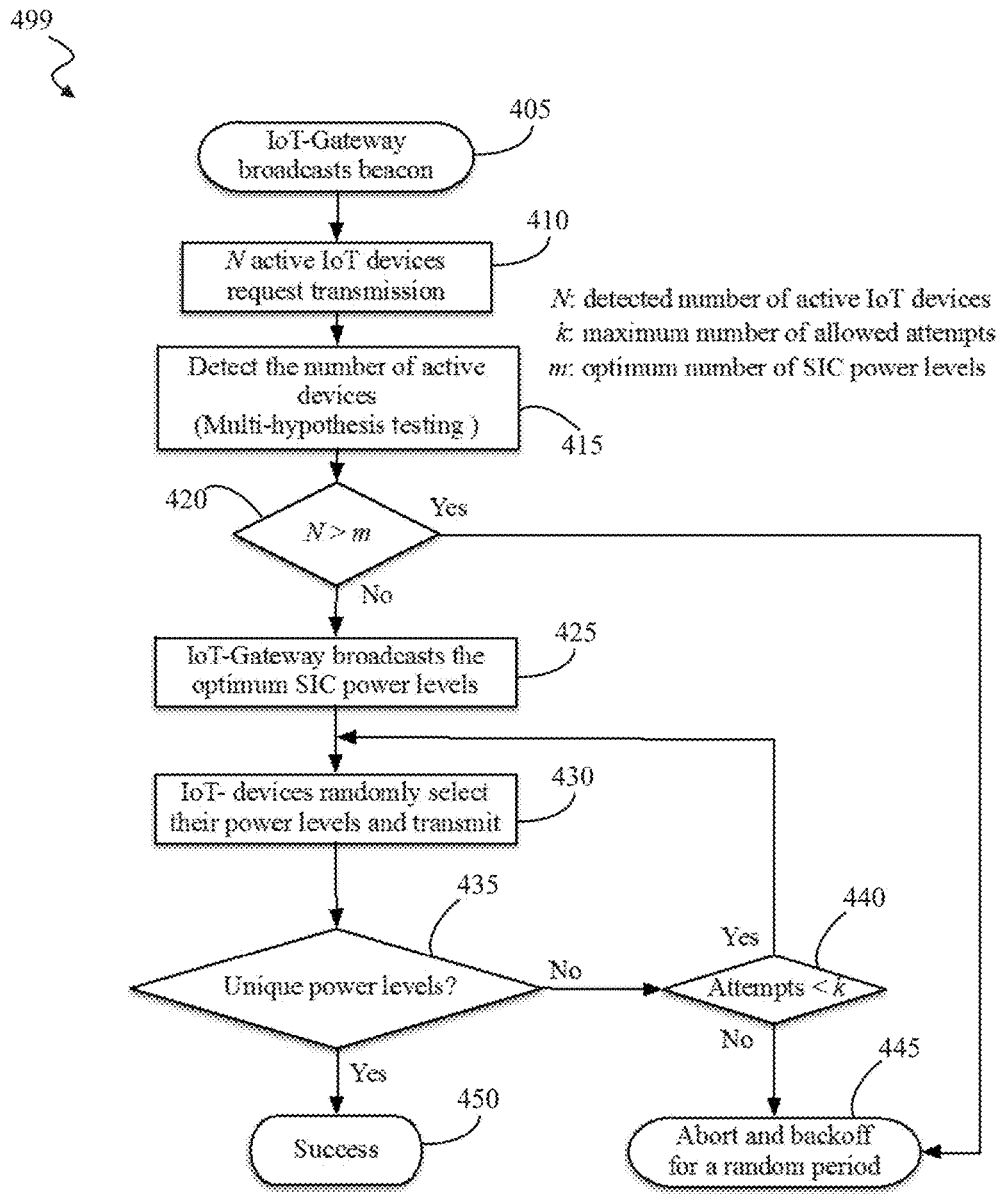
FIG. 4 is a flow diagram illustrating the BF-SA-NOMA protocol phases, in accordance with an embodiment of the present invention.

FIG. 4 illustrates a flow diagram of the method of the present invention 400 for achieving M2M communication over a transmission medium. At a first step 405, the method includes, broadcasting a notification signal, from an Internet of Things (IoT) gateway, to notify a plurality of IoT devices that the IoT gateway is available to receive transmission packets over the transmission medium. At a next step 410, each of the active IoT devices having packets ready to send over the transmission medium transmit a training sequence over the transmission medium in response to the notification signal. After receiving a superposed signal at the IoT gateway, wherein the superposed signal comprises each of the training sequences transmitted from each active IoT device, the method continues at 415 by detecting the number of active IoT devices based upon the received superposed signal. In a particular embodiment, multi-hypothesis testing can be used to determine the number of active IoT device from the superposed signal.

Following the determination of the number of active IoT devices, the method continues at 420 by determining if the number of active IoT devices is less than or equal to a maximum number of optimum power levels of a Successive Interference Cancellation (SIC) receiver of the IoT gateway. If the number of active IoT devices is less than or equal to a maximum number of optimum power levels of the SIC receiver, the method continues at 425 by setting a number of optimum power levels of the SIC receiver to be equal to the number of active IoT devices and broadcasting, by the IoT gateway, the number of optimum power levels of the SIC receiver to the active IoT devices. Alternatively. If the number of active IoT devices is greater than a maximum number of optimum power levels of the SIC receiver, the method continues at 445 by aborting the transmission and broadcasting a next notification signal comprising a random back-off request, to notify the plurality of IoT devices that the IoT gateway is available to receive transmission packets over the transmission medium and to request that the active IoT devices utilize a random back-off in a next transmission of the training sequence over the transmission medium.

If the number of active IoT devices is less than or equal to a maximum number of optimum power levels of the SIC receiver, after setting a number of optimum power levels of the SIC receiver to be equal to the number of active IoT devices and broadcasting the number of optimum power levels of the SIC receiver to the active IoT devices, the method continues at 430 by receiving, at each of the active IoT devices, the number of optimum power levels of the SIC receiver, selecting, by each of the active IoT devices, one of the optimum power levels of the SIC receiver and one of a plurality of receiving antennas of the SIC receiver ad transmitting, by each of the active IoT devices, a device identification associated with the active IoT device and a payload, the payload comprising the selected optimum power level of the SIC receiver ad the selected receiving antenna of the SIC receiver. After transmitting the IoT power levels to the receiver, the method continues at 435 by determining if the selected optimum power level of each of the active IoT devices is distinct. If the selected optimum power level of each of the active IoT devices is distinct, the method continued at 450 by establishing a connection between each of the active IoT devices and the SIC receiver if the selected optimum power level of each of the active IoT devices is distinct.

Alternatively, if it is determined that the selected optimum power level of each of the active IoT devices is not distinct, the method continues at 440 by not establishing a connection between each of the active IoT devices and the SIC receiver and repeating the steps of transmitting and reselecting optimum power levels of the SIC receiver at each of the active IoT devices, until the reselected optimum power each of the active IoT devices is determined to be distinct or until a maximum number of attempts (<k) has been exceeded. If the maximum number of attempts has been exceeded, the method continues to step 445 where the connection is aborted and a negative-acknowledgement (NACK) signal to each of the active IoT devices instructing each of the IoT devices to utilize a random back-off in a next transmission of the training sequence over the transmission medium when a maximum number of attempts has been exceeded.

As previously described, a form of multiple hypothesis testing may be used to determine the number of active IoT devices from the composite signal received at the SIC receiver. The detection of active IoT devices starts in the second phase of the BF-SA-NOMA frame as presented in FIG. 3.

After receiving the beacon (notification signal), all the IoT devices send, at the same power level, a training sequence of length L using the slotted Aloha protocol. The superposed received signal at the IoT gateway from active transmitting IoT devices is given by:

$$y = Hs + w, \qquad (1)$$

where $H=[h_1, h_2, \ldots, h_N] \in \mathbb{R}^{1 \times N}$ and $h_n$ is the channel gain between the nth IoT device and the IoT gateway. $s \in \mathbb{R}^{N \times L}$ is transmit sequence (e.g. BPSK) from N IoT active devices and $w \in \mathbb{R}^{1 \times L}$ is the additive white Gaussian noise with zero mean and variance $\sigma^2$. The multiple hypothesis test is used to detect the number of N active IoT devices from the total M IoT devices. The following procedure is used to sequentially detect the number of active devices:

$\mathcal{H}_0$: Received signal contains only noise
$$y=w$$

$\mathcal{H}_1$: Received signal contains data from at least one IoT device
$$y=h_1 s_1 + w, \quad (2)$$

$\mathcal{H}_N$: Received signal contains data from at most N IoT devices
$$y=Hs+w$$

Assuming, $h_n = 1$, $\forall n \in \{1, 2, \ldots, N\}$. Following the Neyman-Pearson (NP) test, it can be written in Likelihood Ratio (LR) testing $\mathcal{H}_N$ vs. $\mathcal{H}_{N-1}$ as:

$$\frac{p\left(y; \sum_{n=1}^{N} s_n \mathcal{H}_N\right)}{p\left(y; \sum_{n=1}^{N-1} s_n \mathcal{H}_{N-1}\right)} = \quad (3)$$

$$\frac{\exp\left[-\frac{s}{2\sigma^2}\left(y - \sum_{n=1}^{N} h_n s_n\right)^T \left(y - \sum_{n=1}^{N} h_n s_n\right)\right]}{\exp\left[-\frac{s}{2\sigma^2}\left(y - \sum_{n=1}^{N-1} h_n s_n\right)^T \left(y - \sum_{n=1}^{N-1} h_n s_n\right)\right]} \underset{\mathcal{H}_{N-1}}{\overset{\mathcal{H}_N}{\gtreqless}} \gamma, N=1, \ldots, M$$

where $s_n \in \mathbb{R}^{1 \times L}$ is the transmitted sequence from the $n^{th}$ IoT device. By taking the logarithm, (3) is simplified to:

$$T(y) = \frac{1}{L} \sum_{l=0}^{L-1} y \underset{\mathcal{H}_N}{\overset{\mathcal{H}_{N-1}}{\gtreqless}} \quad (4)$$

$$\frac{2\sigma^2 \ln \gamma - \left(\left(\sum_{n=1}^{N-1} h_n s_n\right)\left(\sum_{n=1}^{N-1} h_n s_n\right)^T + \left(\sum_{n=1}^{N} h_n s_n\right)\left(\sum_{n=1}^{N} h_n s_n\right)^T\right)}{-2\left(\sum_{n=1}^{N-1} h_n s_n + \sum_{n=1}^{N} h_n s_n\right)} = \gamma'$$

The NP detector, or the test statistic, in (4) compares the sample mean of the received signal to the threshold $\gamma'$ to decide on a hypothesis $\mathcal{H}_N$ or $\mathcal{H}_{N-1}$. The NP test terminates if the number of detected IoT devices exceeds the SIC receiver optimum power levels, which are 3 levels in this exemplary embodiment. To compute the threshold $\gamma'$ in (4) for a desired probability of false alarm $P_{FA}$, which occurs when deciding $\mathcal{H}_N$ if the test in (4) is greater than the threshold $\gamma'$, so that $P_{FA}$ can be written as:
$$P_{FA} = P(T(y) > \gamma'; \mathcal{H}_N) \quad (5)$$

Since the test in (4) under both hypothesis is a Gaussian distribution, that $$T(y) \sim \mathcal{N}\left(\sum_{l=0}^{L-1} \sum_{n=1}^{N-1} s_n, \frac{\sigma^2}{L}\right)$$

under $\mathcal{H}_{N-1}$ and $$T(y) \sim \mathcal{N}\left(\sum_{l=0}^{L-1} \sum_{n=1}^{N} s_n, \frac{\sigma^2}{L}\right)$$

under $\mathcal{H}_N$ one can rewrite (5) as:

$$P_{FA} = Q\left(\frac{\gamma' - \sum_{l=0}^{L-1} \sum_{n=1}^{N} s_n}{\sqrt{\sigma^2/L}}\right) \quad (6)$$

Thus, the threshold $\gamma'$ is given by:

$$\gamma' = Q^{-1}(P_{FA})\sqrt{\sigma^2/L} + \sum_{l=0}^{L-1} \sum_{n=1}^{N} s_n. \quad (7)$$

Following the same steps, the probability of detecting the number of active devices is:

$$P_D = Q\left(\frac{\gamma' - \sum_{l=0}^{L-1} \sum_{n=1}^{N-1} s_n}{\sqrt{\sigma^2/L}}\right) \quad (8)$$

From (7), (8) one can write the $P_D$ as a function of energy to noise ratio as:

$$P_D = Q\left(Q^{-1}(P_{FA}) + \frac{\sum_{l=0}^{L-1} \sum_{n=1}^{N} s_n - \sum_{l=0}^{L-s} \sum_{n=1}^{N-1} s_n}{\sqrt{\sigma^2/L}}\right) \quad (9)$$

Figure 5:
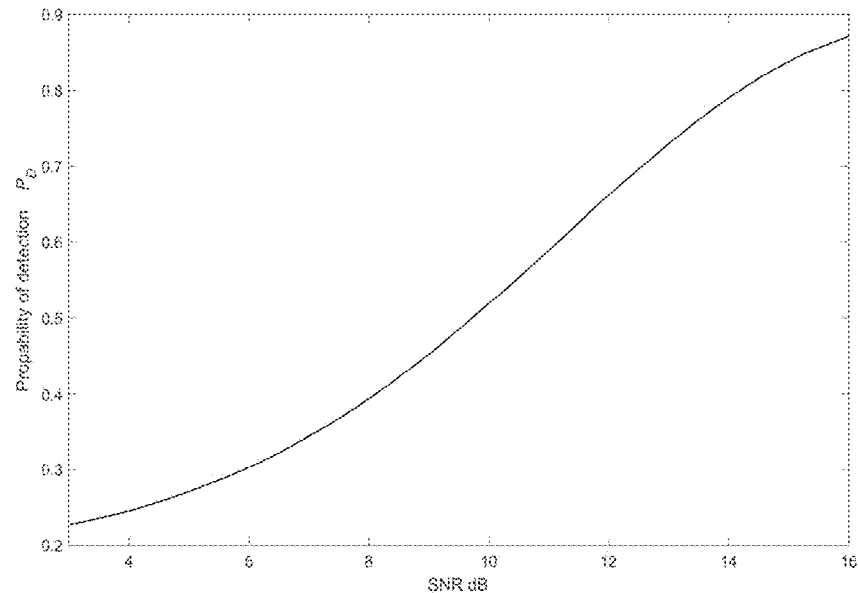
FIG. 5 is a graphical illustration the detection probability of the number of active devices as a function of Signal-to-Noise Ratio (SNR) for $P_{FA}=0.1$, in accordance with an embodiment of the present invention.

The probability of correct detection of the number of active users as a function of the SNR for $P_{FA}=0.1$ is shown in FIG. 5. It can be seen that the detection performance increases monotonically and smoothly with increasing SNR.

In an exemplary embodiment, it is assumed that there is one IoT gateway with $N_r$ receiving antennas and a total of M IoT devices each with $N_t$ transmitting antennas. A binomial distribution is considered to model the random number of active IoT devices N, each with probability of transmission $p_T$:

$$P_r(N; p_T, M) = \binom{M}{N} p_T^N (1-p_T)^{M-N} \quad (10)$$

Figure 6:
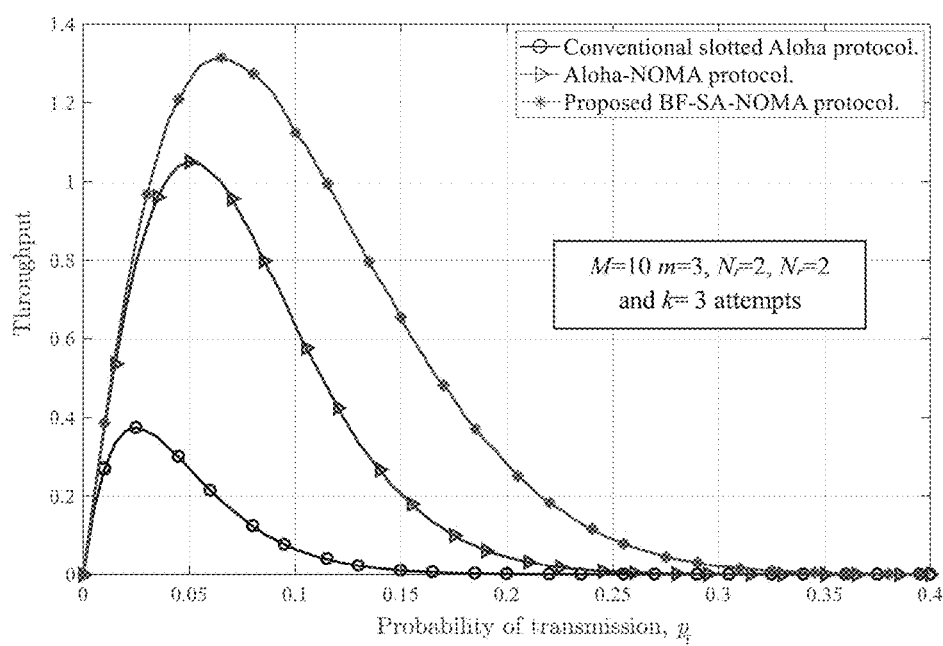
FIG. 6 is a graphical illustration of the throughput of the BF-SA-NOMA vs. Aloha NOMA, for different values of probability of transmission when M=10 m=3, $N_t=2$, $N_r=2$ and k=3 attempts, in accordance with an embodiment of the present invention.

FIG. 6 shows the throughput of BF-SA-NOMA when M=100, m=3 optimum power levels, k=3 attempts, $N_t=2$, Nr=2 and for different values of $p_T$. In the simulation of the exemplary embodiment, throughput is defined as the average number of packets that are successfully decoded for a given probability of transmission. As expected, it can be observed that the throughput decreases as the probability of transmission increases. Also, as expected, it can be seen that the throughput of the BF-SA-NOMA protocol is always higher than that of Aloha-NOMA and conventional SA protocols. In particular, when the probability of transmission is 0.15, the throughput of BF-SA-NOMA is almost 60 times higher than that of conventional slotted Aloha and 2 times higher (i.e., the beamforming gain) than Aloha-NOMA. This demonstrates that the BF-SA-NOMA protocol of the present invention provides a dramatic improvement in throughput, in comparison with conventional slotted Aloha and Aloha-NOMA protocols, due to the additional "virtual" sub-channels in the spatial and power domains. More importantly, it is worth mention that achieving a throughput gain similar to that of the proposed BF-SA-NOMA using Aloha-NOMA requires an excessive increase in the SIC receiver power levels which is impractical when using power-limited IoT devices.

Figure 7:
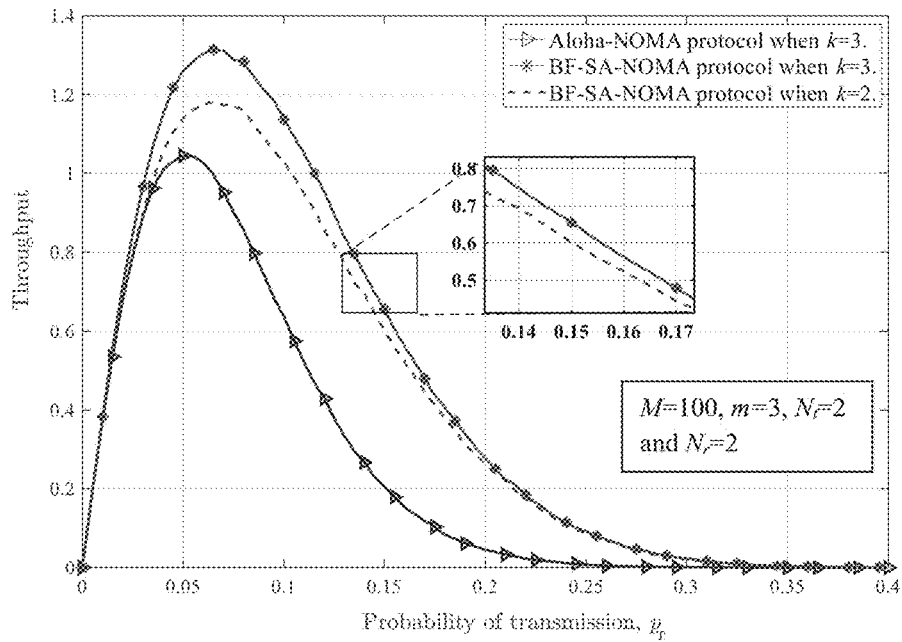
FIG. 7 is a graphical illustration of the throughput of BF-SA-NOMA vs. Aloha-NOMA and conventional slotted Aloha protocols when M=100, m=3, $N_t=2$, $N_r=2$ when k=2 ad 3 attempts, and for different values of probability of transmission, in accordance with an embodiment of the present invention.
Figure 8:
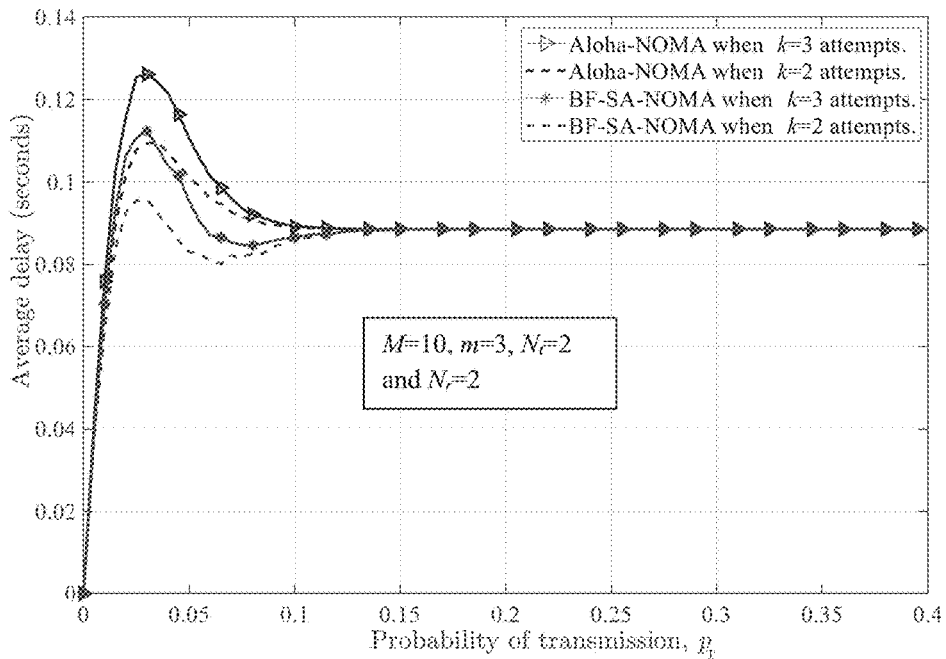
FIG. 8 is a graphical illustration of the average charnel access delay of BF-SA-NOMA vs. Aloha NOMA for different values of probability of transmission when M=10, m=3, $N_t=2$, $N_r=2$ and k=2 and 3 attempts, in accordance with an embodiment of the present invention.

In FIG. 7 and FIG. 8 illustrate the beamforming gains in terms of the throughput and channel access delay of BF-SA-NOMA when k=2, 3 attempts, M=100, m=3. $N_t$=Nr=2, and for different values of probability of transmission. In simulation, the channel access delay is composed of three components, namely: round trip delay, delay due to the attempts for random selection of distinct power levels, and the back-off delay, which occurs if the number of active IoT devices is greater than the degree of SIC receiver or when the IoT devices fail in selecting distinct optimum power levels in k attempts. FIG. 7 and FIG. 8 illustrate the beamforming gains, where it is shown that BF-SA-NOMA when k=2 can still achieve a higher throughput than Aloha-NOMA when k=3 with a lower channel access delay, resulting from reducing the probability of collision and the average back-off delay by creating more "virtual" sub-channels via MIMO beamforming.

Figure 9:
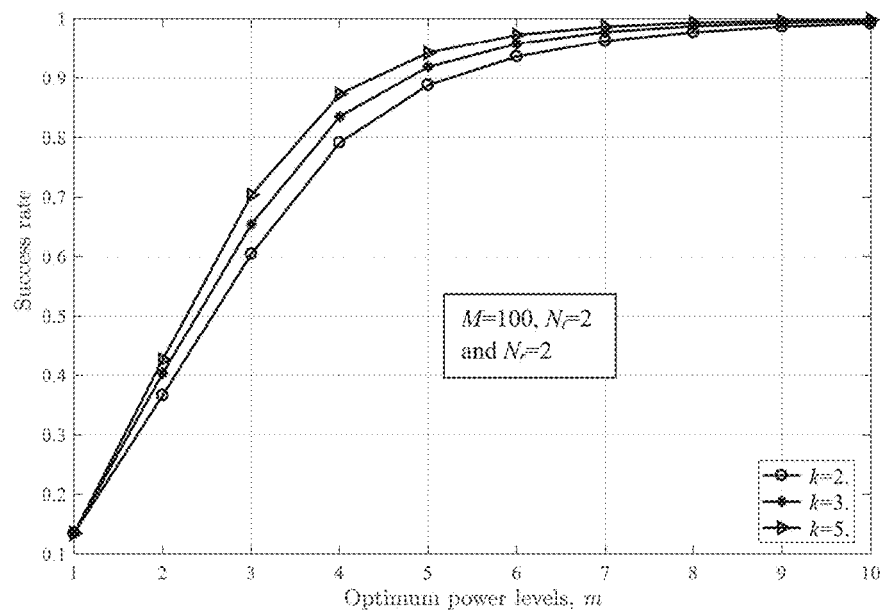
FIG. 9 is a graphical illustration of the success rate of BF-SA-NOMA for different values of optimum power levels when M=100, $N_t=2$, $N_r=2$ and k=2, 3 and 5 attempts, in accordance with an embodiment of the present invention.

In order to see the impact of the number of optimum power levels on the throughput of BF-SA-NOMA, the throughput of BF-SA-NOMA for different power levels are shown in FIG. 9. For M=100, k=2, 3 and 5 and probability of transmission of 0.05, the throughput of Aloha-NOMA increases with the increase in optimum power levels (SIC degree). For example. Aloha-NOMA with 3 power levels has a higher throughput than Aloha-NOMA with 2 power levels. However, the throughput improvement becomes insufficient for optimum power levels greater than 5 (saturation in the throughput gain). Also, the simulation results in FIG. 9, shows the impact of the number of attempts k, for picking distinct optimum power levels, on throughput for different optimal power levels. The more attempts allowed for picking the optimum power levels, the higher the throughput that can be achieved at the cost of increased delay.

Accordingly, in various embodiments, the present invention provides a system ad method for BF-SA-NOMA as a random access protocol that is easy to implement, energy efficient, scalable and compatible with the limited-power and low complexity requirements of IoT devices. The proposed protocol has three major advantages: (i) it uses a form of multiple hypothesis testing at the IoT gateway to determine the number of active IoT devices in the medium. Knowing the number of active IoT devices is essential for optimizing the SIC power levels in order to distinguish between signals transmitted from different IoT devices on the same time and frequency, (ii) by use of beamforming, BF-SA-NOMA demonstrates a significant improvement in throughput for a large number of IoT devices, compared with conventional slotted Aloha and Aloha-NOMA protocols, through the exploitation of power and spatial domains without excessively increasing the SIC power levels which is impractical when using power-limited IoT devices, and (iii) it addresses the Aloha-NOMA channel access delay problem by reducing the probability of collision and consequently lowering the average back-off delay via beamforming. The simulation results show that BF-SA-NOMA can achieve higher throughput than Aloha-NOMA with fewer attempts and consequently a lower channel access delay. Such a random access protocol can be quite important for massive M2M communication in IoT networks.

SOFTWARE AND HARDWARE EXAMPLES

The various techniques described herein can be implemented in connection with hardware or software or, where appropriate, with a combination of both. Thus, the methods and system described herein, or certain aspects or portions thereof, can take the form of program code (i.e., instructions) embodied in tangible media, such as hard drives, solid state drives, or any other machine-readable storage medium, wherein, when the program code is loaded into and executed by a machine, such as a computing device, the machine becomes an apparatus for practicing the invention. In the case of program code execution on programmable computers, the computing device will generally include a processor, a storage medium readable by the processor (including volatile and non-volatile memory and/or storage elements), at least one input device, and at least one output device. The program(s) can be implemented in assembly or machine language, if desired. In may case, the language can be a compiled or interpreted language, ad combined with hardware implementations.

The invention can also be practiced via communications embodied in the form of program code that is transmitted over some transmission medium, such as over electrical wiring or cabling, through fiber optics, or via my other form of transmission, wherein, when the program code is received and loaded into and executed by a machine, such as a EPROM, a gate array, a programmable logic device (PLD), a client computer, or the like, the machine becomes an apparatus for practicing the invention. When implemented on a general-purpose processor, the program code combines with the processor to provide a distinct apparatus that operates to invoke the functionality of the invention. Additionally, my storage techniques used in connection with the invention can be a combination of hardware and software.

While methods, apparatuses and systems have been described in connection with exemplary embodiments of the various figures, it is to be understood that other similar embodiments can be used or modifications and additions can be made to the described embodiments for performing the same function without deviating therefrom. Therefore, the invention should not be limited to my single embodiment, but rather should be construed in breadth and scope in accordance with the appended claims.

What is claimed is:

1. A method for Machine-to-Machine (M2M) communication over a transmission medium, the method comprising:
broadcasting a notification signal, from an Internet of Things (IoT) gateway to notify a plurality of IoT devices that the IoT gateway is available to receive transmission packets over the transmission medium;
transmitting a training sequence over the transmission medium from each active IoT device of the plurality of devices in response to the notification signal;
receiving a superposed signal at the IoT gateway, wherein the superposed signal comprises each of the training sequences transmitted from each active IoT device;
determining, by the IoT gateway, a number of active IoT devices based upon the received superposed signal;
in response to the number of active IoT devices being less than or equal to a maximum number of optimum power levels of a Successive Interference Cancellation (SIC) receiver of the IoT gateway, setting a number of optimum power levels of the SIC receiver to be equal to the number of active IoT devices;

broadcasting, by the IoT gateway, the number of optimum power levels of the SIC receiver to the active IoT devices; and selecting, by each of the active IoT devices, one of a plurality of receiving antennas of the SIC receiver using a pre-calculated precoding matrix, to implement multiple-input multiple-output (MIMO) beamforming at the SIC receiver.

2. The method of claim 1, further comprising, if the number of active IoT devices is greater than a maximum number of optimum power levels of the SIC receiver:

aborting, by the IoT gateway, the setting of the number of optimum power levels of the SIC receiver; and broadcasting, by the IoT gateway, a next notification signal comprising a random back-off request, to notify the plurality of IoT devices that the IoT gateway is available to receive transmission packets over the transmission medium and to request that the active IoT devices utilize a random back-off in a next transmission of the training sequence over the transmission medium.

3. The method of claim 1, further comprising:

receiving, at each of the active IoT devices, the number of optimum power levels of the SIC receiver;

selecting, by each of the active IoT devices, one of the optimum power levels of the SIC receiver;

transmitting, by each of the active IoT devices, a device identification associated with the active IoT device and a payload, the payload comprising the selected optimum power level of the SIC receiver and the selected receiving antenna of the SIC receiver;

receiving, at the SIC receiver, the device identification and the payload from each of the active IoT devices;

determining if the selected optimum power level of each of the active IoT devices is distinct; and establishing a connection between each of the active IoT devices and the SIC receiver if the selected optimum power level of each of the active IoT devices is distinct.

4. The method of claim 3, further comprising:

not establishing a connection between each of the active IoT devices and the SIC receiver if the selected optimum power level of each of the active IoT devices is not distinct;

transmitting a reselect signal, from the IoT gateway, to each of the active IoT devices to reselect an optimum power level and a receiving antenna;

reselecting, by each of the active IoT devices, one of the optimum power levels of the SIC receiver and one of a plurality of receiving antennas of the SIC receiver;

transmitting, by each of the active IoT devices, a device identification associated with the active IoT device and a reselected payload, the payload comprising a reselected optimum power level of the SIC receiver and the selected receiving antenna of the SIC receiver;

transmitting, by each of the active IoT devices, the device identification associated with the active IoT device and the reselected payload;

receiving, at the SIC receiver, the device identification and the reselected payload for each of the active IoT devices;

determining if the reselected optimum power level of each of the active IoT devices is distinct;

repeating transmitting a reselect signal from the IoT gateway, reselecting one of the optimum power levels, transmitting a reselected payload comprising the reselected optimum power level, receiving the device identification and the reselected payload for each of the active IoT devices at the SIC receiver and determining if the reselected optimum power level of each of the active IoT devices is distinct until the reselected optimum power each of the active IoT devices is determined to be distinct or until a maximum number of attempts has been exceeded; and transmitting, from the IoT gateway a negative-acknowledgement signal to each of the active IoT devices instructing each of the IoT devices to utilize a random back-off in a next transmission of the training sequence over the transmission medium when a maximum number of attempts has been exceeded.

5. The method of claim 1, wherein determining, by the IoT gateway, a number of active IoT devices further comprises, utilizing multi-hypothesis testing of the received superposed signal to determine the number of active IoT devices.

6. A system for Machine-to-Machine (M2M) communication over a transmission medium, the system comprising:

a transmitter for broadcasting a notification signal over a transmission medium to notify a plurality of IoT devices that an IoT gateway is available to receive transmission packets over the transmission medium;

a receiver;

for receiving a superposed signal at the IoT gateway, wherein the superposed signal comprises a training sequence transmitted from each active IoT device of the plurality of IoT devices;

for determining a number of active IoT devices based upon the received superposed signal, for setting a number of optimum power levels of a Successive Interference Cancellation (SIC) receiver of the IoT gateway to be equal to the number of active IoT devices, if the number of active IoT devices is less than or equal to a maximum number of optimum power levels of the SIC receiver;

for broadcasting the number of optimum power levels of the SIC receiver to the active IoT devices; and for receiving, by each of the active IoT devices, a device identification associated with the active IoT device and a payload, the payload comprising a selected receiving antenna of a plurality of receiving antennas of the SIC receiver selected by the active IoT device based upon a pre-calculated precoding matrix, to implement multiple-input multiple-output (MIMO) beamforming at the SIC receiver.

7. The system of claim 6, wherein the receiver is further:

for aborting the setting of the number of optimum power levels of the SIC receiver if the number of active IoT devices is greater than a maximum number of optimum power levels of the SIC receiver; and for broadcasting a next notification signal comprising a random back-off request, to notify a plurality of IoT devices that the IoT gateway is available to receive transmission packets over the transmission medium and to request that the active IoT devices utilize a random back-off in a next transmission of the training sequence over the transmission medium.

8. The system of claim 6, wherein the payload further comprises a selected optimum power level of the SIC receiver and wherein the receiver is further:

for determining if the selected optimum power level of each of the active IoT devices is distinct; and for establishing a connection between each of the active IoT devices and the SIC receiver if the selected optimum power level of each of the active IoT devices is distinct.

9. The system of claim 8, wherein the receiver is further:

for not establishing a connection between each of the active IoT devices and the SIC receiver if the selected optimum power level of each of the active IoT devices is not distinct;

for transmitting a reselect signal, from the IoT gateway, to each of the active IoT devices to reselect an optimum power level and a receiving antenna;

for receiving, from each of the active IoT devices, a device identification associated with the active IoT device and a reselected payload at the SIC receiver, the reselected payload comprising a reselected optimum power level of the SIC receiver and the selected receiving antenna of the SIC receiver;

for determining if the reselected optimum power level of each of the active IoT devices is distinct;

for repeating transmitting a reselect signal from the IoT gateway, receiving a device identification and a reselected payload from each of the active IoT devices at the SIC receiver and determining if the reselected optimum power level of each of the active IoT devices is distinct until the reselected optimum power each of the active IoT devices is determined to be distinct or until a maximum number of attempts has been exceeded; and for transmitting a negative-acknowledgement signal to each of the active IoT devices instructing each of the IoT devices to utilize a random back-off in a next transmission of the training sequence over the transmission medium if the maximum number of attempts is exceeded.

10. The system of claim 6, wherein the receiver for determining a number of active IoT devices further comprises, utilizing multi-hypothesis testing of the received superposed signal to determine the number of active IoT devices.

11. An IoT gateway for Machine-to-Machine (M2M) communication over a transmission medium, the IoT gateway comprising:

a transmitter for broadcasting a notification signal to notify a plurality of IoT devices that the IoT gateway is available to receive transmission packets over the transmission medium;

a Successive Interference Cancellation (SIC) Receiver for;

receiving a superposed signal at the IoT gateway, wherein the superposed signal comprises a training sequences transmitted from each active IoT device of a plurality of devices in response to the notification signal;

determining a number of active IoT devices based upon the received superposed signal;

if the number of active IoT devices is less than or equal to a maximum number of optimum power levels of the Successive Interference Cancellation (SIC) receiver of the IoT gateway, setting a number of optimum power levels of the SIC receiver to be equal to the number of active IoT devices;

the transmitter further for broadcasting the number of optimum power levels of the SIC receiver to the active IoT devices; and the receiver further for receiving, by each of the active IoT devices, a device identification associated with the active IoT device and a payload, the payload comprising a selected receiving antenna of a plurality of receiving antennas of the SIC receiver selected by the active IoT device based upon a pre-calculated precoding matrix, to implement multiple-input multiple-output (MIMO) beamforming at the SIC receiver.

12. The IoT gateway of claim 11, wherein the SIC receiver is further for:

if the number of active IoT devices is greater than a maximum number of optimum power levels of the SIC receiver:

aborting the setting of the number of optimum power levels of the SIC receiver; and wherein the transmitter is further for broadcasting a next notification signal comprising a random back-off request, to notify the plurality of IoT devices that the IoT gateway is available to receive transmission packets over the transmission medium and to request that the active IoT devices utilize a random back-off in a next transmission of the training sequence over the transmission medium.

13. The IoT gateway of claim 11, wherein the payload from each of the active IoT device further comprises a selected optimum power level of the SIC receiver, the SIC receiver further for:

determining if the selected optimum power level of each of the active IoT devices is distinct; and establishing a connection between each of the active IoT devices and the SIC receiver if the selected optimum power level of each of the active IoT devices is distinct.

14. The IoT gateway of claim 13, wherein the SIC receiver and the transmitter are further for:

not establishing, by the SIC receiver, a connection between each of the active IoT devices and the SIC receiver if the selected optimum power level of each of the active IoT devices is not distinct;

transmitting, by the transmitter, a reselect signal to each of the active IoT devices to reselect an optimum power level and a receiving antenna;

receiving, at the SIC receiver of the IoT gateway, the device identification and a reselected payload for each of the active IoT devices;

determining, at the SIC receiver, if the reselected optimum power level of each of the active IoT devices is distinct;

repeating transmitting a reselect signal, receiving the device identification and the reselected payload for each of the active IoT devices at the SIC receiver and determining if the reselected optimum power level of each of the active IoT devices is distinct until the reselected optimum power each of the active IoT devices is determined to be distinct or until a maximum number of attempts has been exceeded; and transmitting, from the transmitter, a negative-acknowledgement signal to each of the active IoT devices instructing each of the IoT devices to utilize a random back-off in a next transmission of the training sequence over the transmission medium when a maximum number of attempts has been exceeded.

15. The IoT gateway of claim 11, wherein determining a number of active IoT devices, at the SIC receiver, further comprises, utilizing multi-hypothesis testing of the received superposed signal to determine the number of active IoT devices.

16. A computer program product comprising computer executable instructions embodied on a non-transitory computer-readable medium for performing steps comprising:

broadcasting a notification signal to notify a plurality of IoT devices that an IoT gateway is available to receive transmission packets over the transmission medium; receiving a superposed signal comprising a training sequence transmitted by each active IoT device of the plurality of IoT devices in response to the notification signal; determining a number of active IoT devices based upon the received superposed signal; setting a number of optimum power levels of a Successive Interference Cancellation (SIC) receiver to be equal to the number of active IoT devices if the number of active IoT devices is less than or equal to a maximum number of optimum power levels of the SIC receiver; broadcasting the number of optimum power levels of the SIC receiver to the active IoT devices; and receiving, from each active IoT device, a device identification associated with the active IoT device and a payload, the payload comprising a selected receiving antenna of a plurality of receiving antennas of the SIC receiver selected by the active IoT device based upon a pre-calculated precoding matrix, to implement multiple-input multiple-output (MIMO) beamforming at the SIC receiver.

17. The computer program product of claim 16, further for performing, aborting, by the IoT gateway, the setting of the number of optimum power levels of the SIC receiver if the number of active IoT devices is greater than a maximum number of optimum power levels of the SIC receiver; and broadcasting a next notification signal, comprising a random back-off request, to notify the plurality of IoT devices that the IoT gateway is available to receive transmission packets over the transmission medium and to request that the active IoT devices utilize a random back-off in a next transmission of the training sequence over the transmission medium.

18. The computer program product of claim 16, wherein the payload further comprises a selected optimum power level of the SIC receiver the computer program product further for determining if the selected optimum power level of each of the active IoT devices is distinct; and for establishing a connection between each of the active IoT devices and the SIC receiver if the selected optimum power level of each of the active IoT devices is distinct.

19. The computer program product of claim 18, further for performing, not establishing a connection between each of the active IoT devices and the SIC receiver if the selected optimum power level of each of the active IoT devices is not distinct; for transmitting a reselect signal to each of the active IoT devices to reselect an optimum power level and a receiving antenna; for receiving, from each of the active IoT devices, a device identification associated with the active IoT device and a reselected payload at the SIC receiver, the reselected payload comprising a reselected optimum power level of the SIC receiver and the selected receiving antenna of the SIC receiver; for determining if the reselected optimum power level of each of the active IoT devices is distinct; for repeating transmitting a reselect signal from the IoT gateway, receiving a device identification and a reselected payload from each of the active IoT devices at the SIC receiver and determining if the reselected optimum power level of each of the active IoT devices is distinct until the reselected optimum power each of the active IoT devices is determined to be distinct or until a maximum number of attempts has been exceeded; and for transmitting a negative-acknowledgement signal to each of the active IoT devices instructing each of the IoT devices to utilize a random back-off in a next transmission of the training sequence over the transmission medium if the maximum number of attempts is exceeded.

20. The computer program product of claim 16, wherein determining, by the IoT gateway, a number of active IoT devices further comprises, utilizing multi-hypothesis testing of the received superposed signal to determine the number of active IoT devices.

* * * * *